Aug. 14, 1962 J. TALAMONTI 3,049,356
SHAFT OIL SEAL MEANS WITH DEFLECTOR
Filed June 2, 1958

INVENTOR.
John Talamonti
BY
Jones, Darbo + Robertson
Att'ys.

United States Patent Office 3,049,356
Patented Aug. 14, 1962

3,049,356
SHAFT OIL SEAL MEANS WITH DEFLECTOR
John Talamonti, Chicago Heights, Ill., assignor, by mesne assignments, to Borg-Warner Corporation, Chicago, Ill., a corporation of Illinois
Filed June 2, 1958, Ser. No. 739,042
5 Claims. (Cl. 277—183)

This invention relates to shaft oil seal means more particularly provided with a peripheral flaring flange for deflecting an excess of oil therefrom.

Seals for preventing or inhibiting the egress of oil between a rotating shaft and the housing therefor are frequently located adjacent revolving oil throw elements, the latter enhancing the lubricating function but subjecting the sealing means to excessive loads that may cause undesirable egress of oil from the engine case.

An important object of the present invention is the provision of means for deflecting such excess oil from the sealing device and effecting an enhanced sealing function of the latter.

While the invention is here illustrated applied to an engine front end it is equally adaptable for other installations such as engine rear main bearings.

The invention will be understood by reference to the following description, taken together with the accompanying drawings, showing an illustrative embodiment of the invention, and in which drawings—

Figure 1:
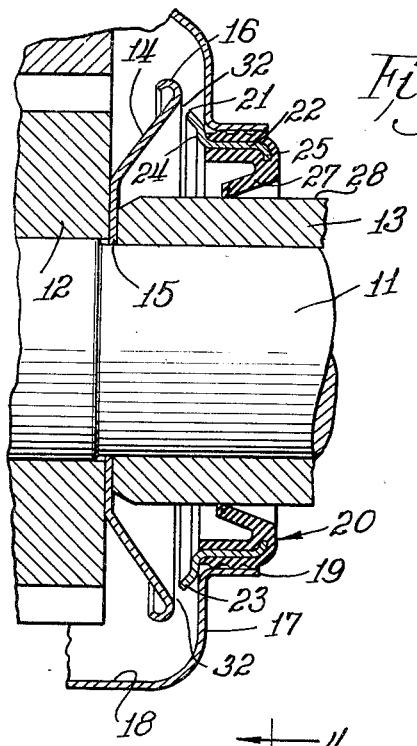
FIGURE 1 is an axial sectional view used for purposes of illustration, showing a rotating shaft and a housing therefor with the invention applied thereto.
Figure 4:
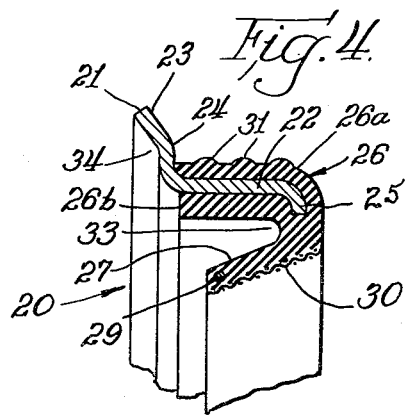
FIGURE 4 is a still further enlarged cross-section taken on the line 4—4 of FIG. 2.
Figure 2:
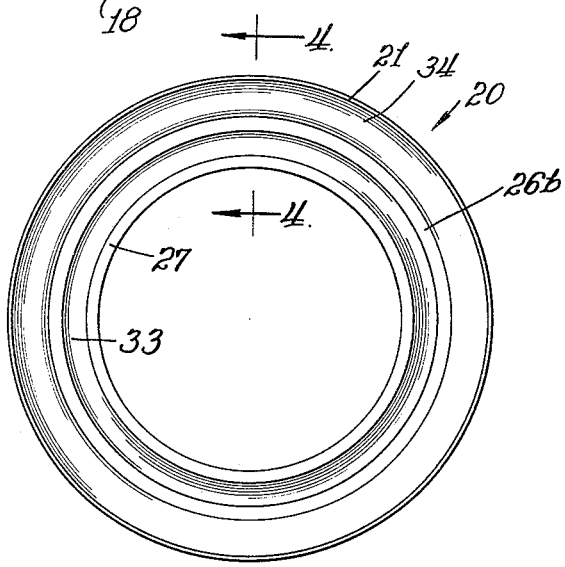
FIGURE 2 is an enlarged front view of the annular sealing means shown in FIG. 1.
Figure 3:
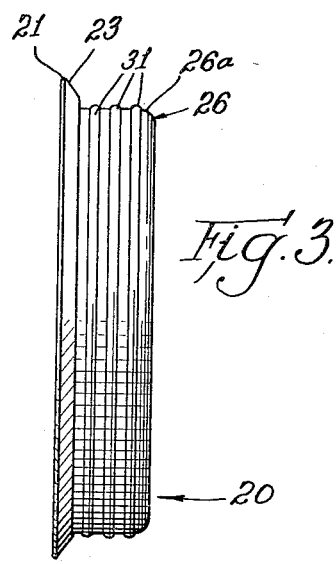
FIGURE 3 is a side view of the means of FIG. 2.

The particular installation selected for purposes of illustration of the present invention includes, as here shown, a rotating shaft 11 upon which may be suitably keyed to rotate therewith a timer gear 12 for example and a shaft sleeve 13 on which may be carried (as need not be here shown) other engine rotating parts. Clamped between the gear member 12 and the sleeve 13 is an oil throw disc 14 the central dished part 15 of which is clamped between the gear member 12 and the sleeve 13 so that the oil throw disc also rotates with the shaft. The oil throw disc has in this instance a curled back periphery 16 that extends into the region of the engine case 17, the latter providing a lubricant housing for the rotating parts and including an oil sump 18 at its lower end. It will be understood that the lubricating oil in the sump 18 is picked up by the peripheral margin 16 of the oil throw disc 14 and carried to upper parts of the case 17 for lubrication purposes.

Since it is desirable that lubricating oil above referred to be confined to the engine case and be prohibited egress therefrom along the surface of the sleeve 13 which projects outwardlyy from the casing, oil sealing means between the sleeve 13 and the outlet 19 of the engine case is provided, such oil seal means being here designated in general by the numeral 20.

In accordance with the present invention, the novel oil seal means 20 comprises an annular shell 21 of substantially rigid material, such as a metal stamping having an axially extending band portion 22 and an outer flaring frusto-conical flange portion 23. Between the band portion 22 and the flaring portion 23 is a radially extending portion 24, and, at the opposite end of the band portion 22, an inturned integral radially extending annular offset 25.

Further in accordance with the present invention, molded about the band portion 22 and offset 25 is an elastomer body 26 desirably of natural or synthetic rubber, resistant to the action of lubricating oil, heat, cold, and the like.

It will be seen that the elastomer body 26 has the shell band 22 embedded therewithin and on its radially inner side has an integral inclined annular lip portion 27 that bears on the rotating surface 28 of the shaft sleeve 13. Preferably, the lip portion 27 carries at its distal edge a resilient wire insert 29 that may be initially a single split annulus located in the lip portion 27 during molding of the latter, in accordance with Patent No. 2,480,116 of August 30, 1949, to Olin Brummer, and similarly, the bearing surface of the lip portion 27 advantageously carries a fabric facing 30 that is somewhat oil absorbent for the purpose both of taking oil off the sleeve surface 28 and of serving as a lubricant carrier between the sleeve surface and the sealing device lip, to minimize wear on the lip 27.

The band portion 22 is faced both exteriorly as at 26a and interiorly as at 26b with portions of the body 26. The outer surface of the elastomer body 26, still following the present invention, is provided with a number of, in this instance three, peripheral integrally molded annular ribs 31 for a purpose later described. The sealing device 20 desirably has a bell shape being hollowed both at 33 adjacent the lip periphery and at 34 adjacent the shell periphery. The offset portion 25 of the band serves further to anchor the shell member 21 in the elastomer body 26 and to conform to the bell shape of the device 20. The end of the body 26 opposite the flange 21 has a rounded external edge to facilitate assembly in the outlet 19.

As best seen in FIGURE 1, the sealing device 20 is pressed into the outlet 19 of the engine case 17 from the inside face of the casing member with the shell flange 23 and elastomer lip 27 facing in the same direction, i.e., inwardly of the case, and with the body peripheral ribs 31 making a force fit in the case outlet 19 so as to provide an oil seal thereat. At this time the radially extending portion 24 of the shell may abut the inner wall of the case 17 adjacent its outlet. The radially extending portion 24 provides a stop limiting axial movement of the seal device in opening 19. The sealing lip 27 rides on the sleeve surface 28 and provides another oil seal thereat.

Still following the present invention, the outer edge of the shell flaring portion 23 approaches but does not contact the oil throw disc 14, a restricted annular space 32 remaining therebetween. Lubricating oil thrown by the rotating disc 14 is in part deflected away from the sealing device 20 by the flaring flanged portion 23 of the shell 21 of the device while, at the same time, a restricted passage is provided, between the oil throw disc and the sealing device, by which some but not an excessive amount of oil is permitted to fall on the sleeve 13 to lubricate the frictionally contacting sealing surfaces of the parts. Excess oil that is thrown by the disc 14 falls on the back of the flange 23 of the sealing device shell 21 and can run down therearound to return to the oil sump 18.

So constructed and arranged a unitary oil seal device with a built-in oil deflector is provided, that serves enhanced efficiency purposes at relatively low cost.

The invention having been described, such changes may be made in the illustrative embodiment as fall within the scope of the appended claims without departing therefrom.

What is here claimed is:

1. The combination of an oil throw element and a rotating shaft seal adapted to be positioned about a rotatable shaft comprising a housing defining an oil sump and having an axially extending outlet formed therein, said outlet positioned to surround said shaft, an oil throw disc having a radially extending central dished portion and having an axially extending frusto-conical shaped portion terminating in a curled back periphery extending into said oil sump, an annular shell of rigid material having an axially extending band portion and having a radially extending portion terminating in an outer flaring frusto-conical flange portion, said outer flaring frusto-conical flange portion being positioned adjacent said curled back periphery to prevent the egress of oil through said outlet, and an elastomer body having said axially extending band embedded therein and having an inclined annular lip in engagement with said shaft.

2. The combination of an oil throw element and a rotating shaft seal adapted to be positioned about a rotatable shaft comprising a housing defining an oil sump and having an axially extending outlet formed therein, said outlet positioned to surround said shaft, an oil throw disc having a radially extending central dished portion and having an axially extending frusto-conical shaped portion terminating in a curled back periphery extending into said oil sump, an annular shell of rigid material having an axially extending band portion terminating on one end in an inturned integral radially extending annular offset and having a radially extending portion terminating in an outer flaring frusto-conical flange portion, said outer flaring frusto-conical flange portion being positioned adjacent said curled back periphery to prevent the egress of oil through said outlet, and an elastomer body having said axially extending band and said inturned integral radially extending annular offset embedded therein and having an inclined annular lip in engagement with said shaft.

3. An apparatus in accordance with claim 1 wherein said annular lip carries a resilient wire insert embedded therein.

4. An apparatus in accordance with claim 1 wherein said annular lip carries an oil absorbent fabric facing.

5. An apparatus in accordance with claim 1 wherein said elastomer body is provided with a plurality of integrally molded annular ribs.

References Cited in the file of this patent

UNITED STATES PATENTS

| | | |
|---|---|---|
| 1,945,090 | Moorhouse | Apr. 10, 1934 |
| 2,185,790 | Kosatka et al. | Jan. 2, 1940 |
| 2,558,183 | Kosatka | June 26, 1951 |
| 2,634,141 | McIntyre et al. | Apr. 7, 1953 |
| 2,647,002 | Brummer | July 28, 1953 |
| 2,647,777 | Kosatka | Aug. 4, 1953 |

FOREIGN PATENTS

| | | |
|---|---|---|
| 815,283 | Germany | Oct. 1, 1951 |
| 869,367 | France | Jan. 30, 1942 |